(12) United States Patent
Schober et al.

(10) Patent No.: US 8,210,951 B2
(45) Date of Patent: Jul. 3, 2012

(54) DUAL-MASS FLYWHEEL (75) Inventors: Martin Schober, Molln (AT); Christian Benatzky, Waidhofen an der Ybbs (AT); Gerd Schlager, Kefermarkt (AT); Jaroslaw Lutoslawski, Concord (CA)

(73) Assignee: MAGNA Powertrain AG & Co KG, Lannach (AT)

( * ) Notice: Subject to any disclaimer, the term of this patent is extended or adjusted under 35 U.S.C. 154(b) by 161 days.

(21) Appl. No.: 12/677,341

(22) PCT Filed: Sep. 9, 2008

(86) PCT No.: PCT/EP2008/007380
§ 371 (c)(1),
(2), (4) Date: Mar. 10, 2010

(87) PCT Pub. No.: WO2009/033638
PCT Pub. Date: Mar. 19, 2009

(65) Prior Publication Data
US 2010/0210365 A1    Aug. 19, 2010

(30) Foreign Application Priority Data

Sep. 10, 2007 (DE) .................. 10 2007 042 980
Apr. 4, 2008 (DE) .................. 10 2008 017 352

(51) Int. Cl.
F16F 15/123   (2006.01)
(52) U.S. Cl. .................................... 464/68.9
(58) Field of Classification Search ............. 464/66.1, 464/68.1, 68.9, 109
See application file for complete search history.

(56) References Cited

U.S. PATENT DOCUMENTS

| 1,443,026 | A | | 1/1923 | Lee |
| 3,593,542 | A | * | 7/1971 | Urayama |
| 3,724,815 | A | * | 4/1973 | Hawkins et al. |
| 4,290,516 | A | | 9/1981 | West et al. |
| 4,467,905 | A | | 8/1984 | Takeuchi |
| 4,555,008 | A | | 11/1985 | Nagano |
| 5,201,394 | A | * | 4/1993 | Suzuki ................. 464/68.2 |
| 5,697,261 | A | | 12/1997 | Mokdad et al. |
| 6,041,678 | A | * | 3/2000 | Cooke et al. ........... 464/68.1 |

(Continued)

FOREIGN PATENT DOCUMENTS

DE         165370 C     11/1904
(Continued)

OTHER PUBLICATIONS

German Search Report for German Patent Application No. 10 2007 042 980.2, dated Jan. 29, 2008, and English translation thereof.

(Continued)

*Primary Examiner* — Gregory Binda
*Assistant Examiner* — Josh Skroupa
(74) *Attorney, Agent, or Firm* — Harness, Dickey & Pierce, P.L.C.

(57) ABSTRACT

A dual-mass flywheel for a drive train of a motor vehicle having a primary flywheel mass and a secondary flywheel mass which are coupled to one another in a rotationally elastic manner via at least one spring device. At least one gear device is disposed between the spring device and at least one of the two flywheel masses. The gear device causing a deflection movement of the spring device relative to a rotational movement of the two flywheel masses in relation to one another, wherein a characteristic curve of the spring device may be modified by the gear device.

22 Claims, 9 Drawing Sheets

U.S. PATENT DOCUMENTS

| | | | |
|---|---|---|---|
| 6,119,840 A * | 9/2000 | Dettmar | 192/70.17 |
| 6,182,809 B1 | 2/2001 | Reik et al. | |
| 6,371,857 B1 | 4/2002 | Kono et al. | |
| 6,666,283 B2 * | 12/2003 | Frauhammer et al. | |

FOREIGN PATENT DOCUMENTS

| | | | |
|---|---|---|---|
| DE | 3213748 A1 | 11/1982 |
| DE | 4200174 A1 | 8/1992 |
| DE | 19634380 A1 | 3/1997 |
| DE | 19919458 A1 | 3/2000 |
| DE | 10297771 T5 | 8/2005 |
| DE | 102004024739 A1 | 12/2005 |
| EP | 0685044 A1 | 12/1995 |
| EP | 1120582 A1 | 8/2001 |
| GB | 2343233 A | 5/2000 |
| JP | 3265737 A | 11/1991 |
| JP | 4004341 A | 1/1992 |
| WO | 96/06289 A1 | 2/1996 |
| WO | 99/41525 A1 | 8/1999 |
| WO | 2004/016968 A1 | 2/2004 |
| WO | WO 2004/016968 * | 2/2004 |

OTHER PUBLICATIONS

German Search Report for German Patent Application No. 10 2008 017 352.5, dated Jan. 22, 2009, and English translation thereof.

* cited by examiner

DUAL-MASS FLYWHEEL

CROSS-REFERENCE TO RELATED APPLICATIONS

This application is a 371 National Stage of International Application No. PCT/EP2008/007380, filed Sep. 9, 2008. This application claims the benefit and priority of German Patent Application No. 10 2008 017 352.5 filed Apr. 4, 2008 and German Patent application No. 10 2007 042 980.2 filed Sep. 10, 2007. The disclosures of the above applications are incorporated herein by reference.

FIELD

The present invention relates to a dual mass flywheel for a drive train of a motor vehicle having a primary flywheel mass and a secondary flywheel mass which are rotationally elastically coupled to one another via at least one spring device.

BACKGROUND

The statements in this section merely provide background information related to the present invention and may not necessarily constitute prior art.

Such a dual mass flywheel serves in a motor vehicle for the intermediate storage of kinetic energy during the idle strokes of the engine and for the taking up and damping of rotational vibrations between the engine and the drive train. In a vehicle with a shift transmission, the primary flywheel mass can, for example, be rotationally fixedly connected to a crankshaft of the engine, while the secondary flywheel mass is rotationally fixedly connected to a clutch of the shift transmission. Rotational vibrations which are conducted via the crankshaft to the primary flywheel mass are only transferred to the secondary flywheel mass and thus to the shift transmission and to the further drive train in an attenuated form thanks to the spring device and a possible additional damping device.

In known dual mass flywheels, the spring device takes up an undesirably large construction space, in particular when a flat spring characteristic should be realized with a correspondingly long spring. The usual linear spring characteristic of the known dual mass flywheels has also proven not to be suitable for all applications. This section provides background information related to the present disclosure which is not necessarily prior art.

SUMMARY

It is an object of the present invention to provide a dual mass flywheel having reduced space requirements for the spring device. In addition, the realization of a non-linear spring characteristic should also be possible.

This object is satisfied by a dual mass flywheel having at least one transmission device arranged between the spring device and at least one of the two flywheel masses, said transmission device effecting a deflection movement of the spring device with respect to a rotational movement of the two flywheel masses relative to one another, with a characteristic of the spring device being able to be modified by the transmission device.

In the dual mass flywheel in accordance with the invention, the rotationally elastic coupling of the two flywheel masses takes place via at least one spring device and via an associated transmission device. A rotational movement of the two flywheel masses relative to one another effects a deflection movement of the spring device with respect to a rest position so that a restoring torque is generated. In the case of such a relative rotational movement of the two flywheel masses, the transmission device effects a deflection movement of the spring device relative to the relative rotational movement of the two flywheel masses so that the deflection path of the spring device is, for example, smaller than the relative rotational displacement (corresponding to a section of a circular path) of the two flywheel masses at the location of the spring device.

Due to the reduction effect which occurs in this case, comparatively stiff springs can be used for the spring device in order nevertheless to produce a flat global characteristic of total characteristic—that is a flat characteristic of the total system of spring device and transmission device. The construction space required for the spring device is reduced by the ability to use stiffer springs since stiffer springs can generally be designed to be shorter. The spring device preferably has at least one elastic element, in particular a helical spring acting as a compression spring, which is arranged tangentially—i.e. in the peripheral direction—with respect to the axis of rotation of the dual mass flywheel.

It is generally possible that the transmission device effects a step-up movement, a step-down movement or a direct translation.

A further advantage of this dual mass flywheel lies in the fact that, if required, a non-linear global spring characteristic/ total characteristic can simultaneously be realized by means of the transmission device to match the vibrating characteristic of the dual mass flywheel ideally to the respective application. It is only necessary for this purpose that the transmission device effects a deflection movement of the spring device in accordance with a non-linear total characteristic. The transmission device can, for example, have a cam profile and a counter-element (e.g. a roller element bearing or a plain bearing) movable along the cam profile to realize a non-linear characteristic of the reduction/increase in accordance with the course of the cam profile.

A non-linear characteristic can be produced, for example, in that the aforesaid control track has a radius of curvature varying along the control track.

In addition, the transmission device can be formed by an exchangeable assembly so that the dual mass flywheel can be matched to different applications solely by replacement of the transmission device in accordance with a modular principle. The vibration characteristic of the dual mass flywheel is thus solely adjustable to different applications by replacement of the transmission device.

The spring device preferably has two ends, with the spring device only being held at the two ends and being aligned substantially in a straight line between the two ends. The use of elastic elements in straight lines—e.g. springs or pressure cartridges—has the advantage that, in the operation of the dual mass flywheel, they are not supported at the radially outer side at a housing element of the dual mass flywheel, in contrast to bow springs, whereby the arising of unwanted friction torques dependent on the speed of revolution is avoided.

Provision can be made that the transmission device cooperates with the spring device via an intermediate element which is rotatably supported with respect to the axis of rotation of the dual mass flywheel to take up centrifugal forces acting on the spring device. In other words, the intermediate element is arranged in a communicating position between the transmission device and the spring device, with the term "communicating position" in this connection having to be seen in a functional sense and not necessarily a spatial sense. The intermediate element is expediently only movable in one direction of rotation. The intermediate element is in particular supported in a floating manner about the axis of rotation of the dual mass flywheel and is rotationally movable both relative to the primary flywheel mass and relative to the secondary flywheel mass.

A plurality of intermediate elements can also be provided which are, for example, effective independently of one another in individual angular segments in the peripheral direction. It is, however, preferred if the intermediate element is designed as a closed ring. With such a ring-shaped intermediate element, the centrifugal forces acting on the intermediate element compensate one another, whereby it only has to be supported insignificantly radially outwardly and unwanted friction effects can be avoided. Such an intermediate element can also be designed as a ring plate which is arranged radially within the spring device in a central plane of the dual mass flywheel. This additionally facilitates the centration of the intermediate element.

The intermediate element can have at least one driver portion which cooperates with the spring device. Alternatively or additionally, the intermediate element can have at least one actuation section which cooperates with the transmission device.

The coupling of the transmission device to the intermediate element can take place, for example, via a toothed arrangement—possibly even having only one single tooth—a roll or a slide shoe in conjunction with a cam track or a cam guide.

In accordance with an advantageous embodiment, the transmission device has at least one lever which is pivotably connected to one of the two flywheel masses (e.g. the primary flywheel mass), with the lever having a drive section which cooperates with the other one of the two flywheel masses (e.g. the secondary flywheel mass) to drive the lever to make a pivot movement on a rotational movement of the two flywheel masses relative to one another. The named lever furthermore has a deflection section which cooperates with the spring device to effect a deflection movement of the spring device on a pivot movement of the lever. A particularly simple and effective reduction/increase of the deflection movement of the spring device due to a relative rotational movement of the two flywheel masses can be realized by such a design and arrangement of a lever.

The above-described cam profile can be formed at an external cam or at an internal cam which is arranged rotationally fixedly with respect to one of the flywheel masses. The coupling between the transmission device and the external cam or the internal cam can take place, for example, via a roll or a slide shoe in conjunction with a cam track, a gear in conjunction with a toothed track or a cam guide. The named external cam or internal cam is in particular arranged coaxially to the axis of rotation of the dual mass flywheel.

The cooperation of the named lever with the other one of the two flywheel masses (e.g. the secondary flywheel mass) can in particular take place via a control track and a drive element cooperating therewith. The drive section of the lever can, for example, have a control track, while the named other one of the two flywheel masses has a drive element (e.g. ball bearing, roll or slide shoe) which can be moved along the control track so that, on a rotational movement of the two flywheel masses relative to one another, the lever is driven to make the explained pivot movement.

In accordance with an advantageous embodiment, the transmission device has a cam which is rotatably connected to one of the two flywheel masses (e.g. the primary flywheel mass), with the cam having a drive section which cooperates with the other one of the two flywheel masses (e.g. the secondary flywheel mass) to drive the cam to make a rotational movement on a rotational movement of the two flywheel masses relative to one another. The named cam has an eccentric section which cooperates with the spring device to effect the explained deflection movement of the spring device on a rotational movement of the cam. The explained reduction or increase of the deflection movement can hereby be realized in a particularly compact constructional shape. The axis of rotation of the named cam is in particular offset in parallel with respect to the axis of rotation of the dual mass flywheel.

The cooperation of the cam with the named other one of the two flywheel masses can be realized by respective external toothed arrangements. The drive section of the cam can in particular have a spur gear toothed arrangement which meshes with an external toothed arrangement of a ring section of the other one of the two flywheel masses (e.g. secondary flywheel mass). A plurality of cams can hereby also be coupled to the named other one of the two flywheel masses synchronously with one another in a particularly simple manner.

A non-linear deflection characteristic can be effected with this embodiment, for example, in that the eccentric section of the cam forms a cam profile, with a non-linear angular dependence of the radius of the cam profile being provided.

DRAWINGS

The invention will be described in the following only by way of example with reference to the drawings.

DETAILED DESCRIPTION

Figure 1:
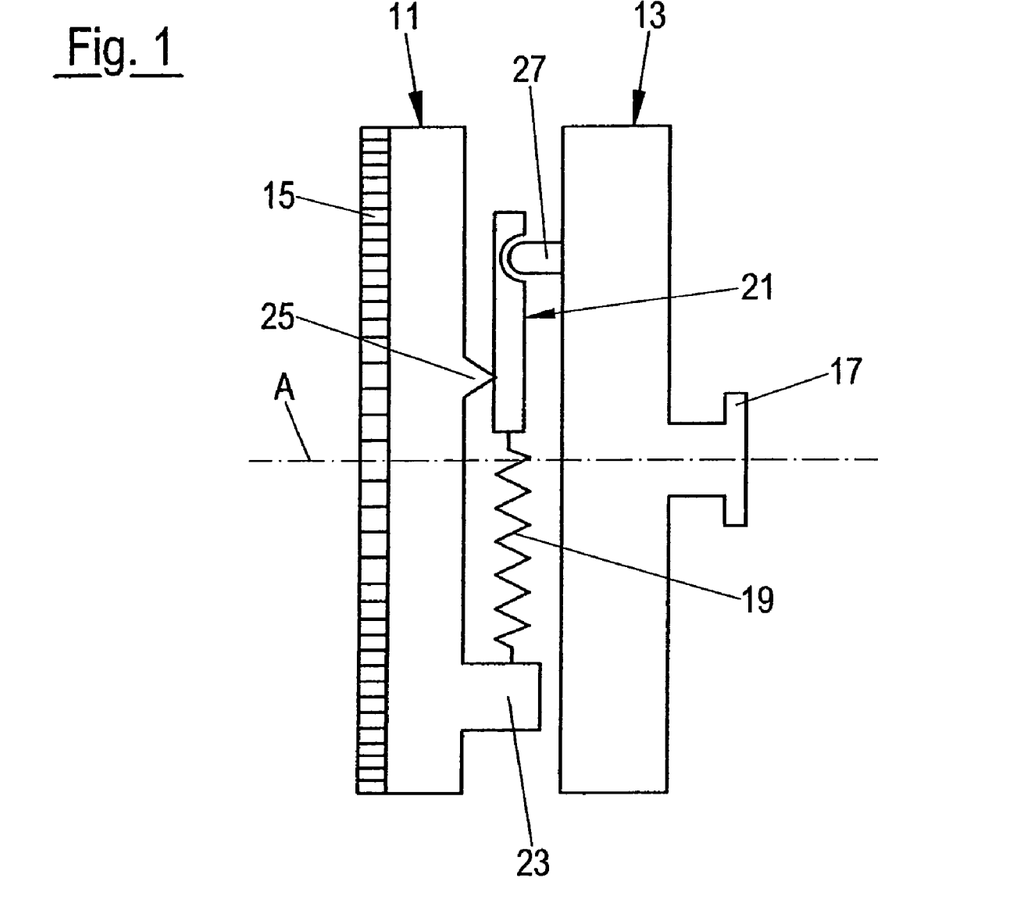
FIG. 1 shows a dual mass flywheel in a schematic side view.

FIG. 1 schematically shows a dual mass flywheel having a primary flywheel mass 11 and a secondary flywheel mass 13 which are rotatably supported about a common axis of rotation A. The primary flywheel mass 11 is connected rotationwise, for example, to an output element of an engine of a motor vehicle via a sprocket 15. A fastening flange or a plug toothed arrangement can also be provided, for example, instead of the sprocket 15. The secondary flywheel mass 13 is connected, for example, to a clutch of a shift transmission or to a torque converter of an automatic transmission via a fastening flange 17, with alternatively a connection also being able to be provided by means of plug toothed arrangement or a one-piece design.

The dual mass flywheel serves in a manner known per se for the taking up and damping of rotationally elastic vibrations. For this purpose, the two flywheel masses 11, 13 are rotationally elastically coupled to one another via a spring device 19, i.e. the two flywheel masses 11, 13 can rotate relative to one another, with such a rotational movement effecting a deflection movement of the spring device 19 starting from a rest position so that the spring device 19 generates a restoring torque.

A transmission device is arranged between the spring device 19 and the secondary flywheel mass and acts as a reduction device 21 here, i.e. the spring device 19 is fastened at one end to a fastening section 23 of the primary flywheel mass 11 and is fastened or pivotally connected at the other end to the reduction device 21. The reduction device 21 is shown schematically as a lever in FIG. 1 which is pivotably supported within a normal plane to the axis of rotation A at a bearing section 25 of the primary flywheel mass 11 and is actuated by means of a drive spigot 27 of the secondary flywheel mass 13 in the event of a rotational movement of the primary flywheel mass 11 and of the secondary flywheel mass 13 relative to one another.

The reduction device 21 is configured such that it effects a reduction of the named deflection movement of the spring device 19 in the event of a rotational movement of the two flywheel masses 11, 13 relative to one another, and indeed with respect to the relative rotational displacement of the two flywheel masses 11, 13 relative to one another. The spring device 19 can hereby be formed as a compression spring with comparatively high stiffness which can be realized with an advantageously short construction length. The spring device 19 thus only takes up a small construction space. The global spring characteristic of the dual mass flywheel shown—that is the spring characteristic resulting from the cooperation of the spring device 19 with the reduction device 21—is nevertheless relatively flat in comparison with the characteristic of the spring device 19 alone due to the reduction effect of the reduction device 21. A non-linear global spring characteristic of the dual mass flywheel can additionally be adopted by means of the reduction device 21.

It must be pointed out that in the above admittedly only a reduction effect between the spring device 19 and the secondary flywheel mass 13 is spoken of. However, for specific applications, a direct translation of the deflection movement—or even a step-up effect—may be of advantage so that the reduction device 21 can be understood very generally as a transmission device.

Possible embodiments of a dual mass flywheel in accordance with the invention will be explained in more detail in the following by way of example.

Figure 2:
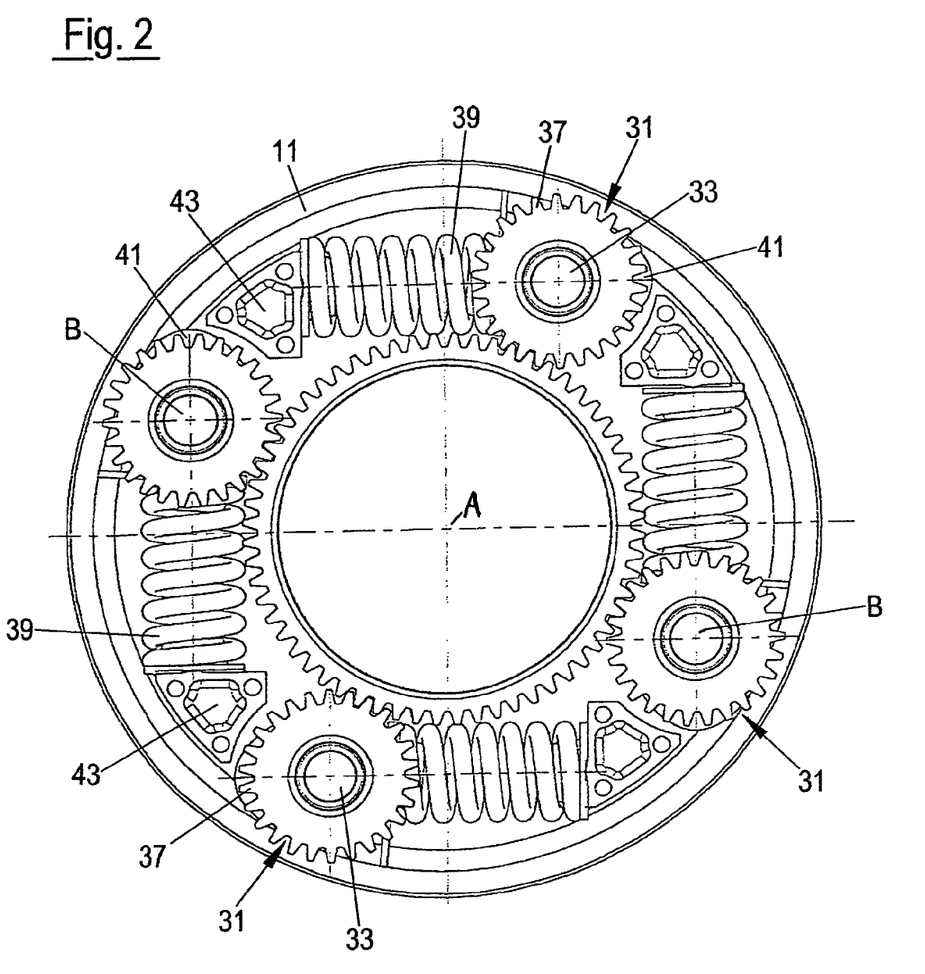
FIG. 2 shows parts of a dual mass flywheel in accordance with a first embodiment in a front view.
Figure 3:
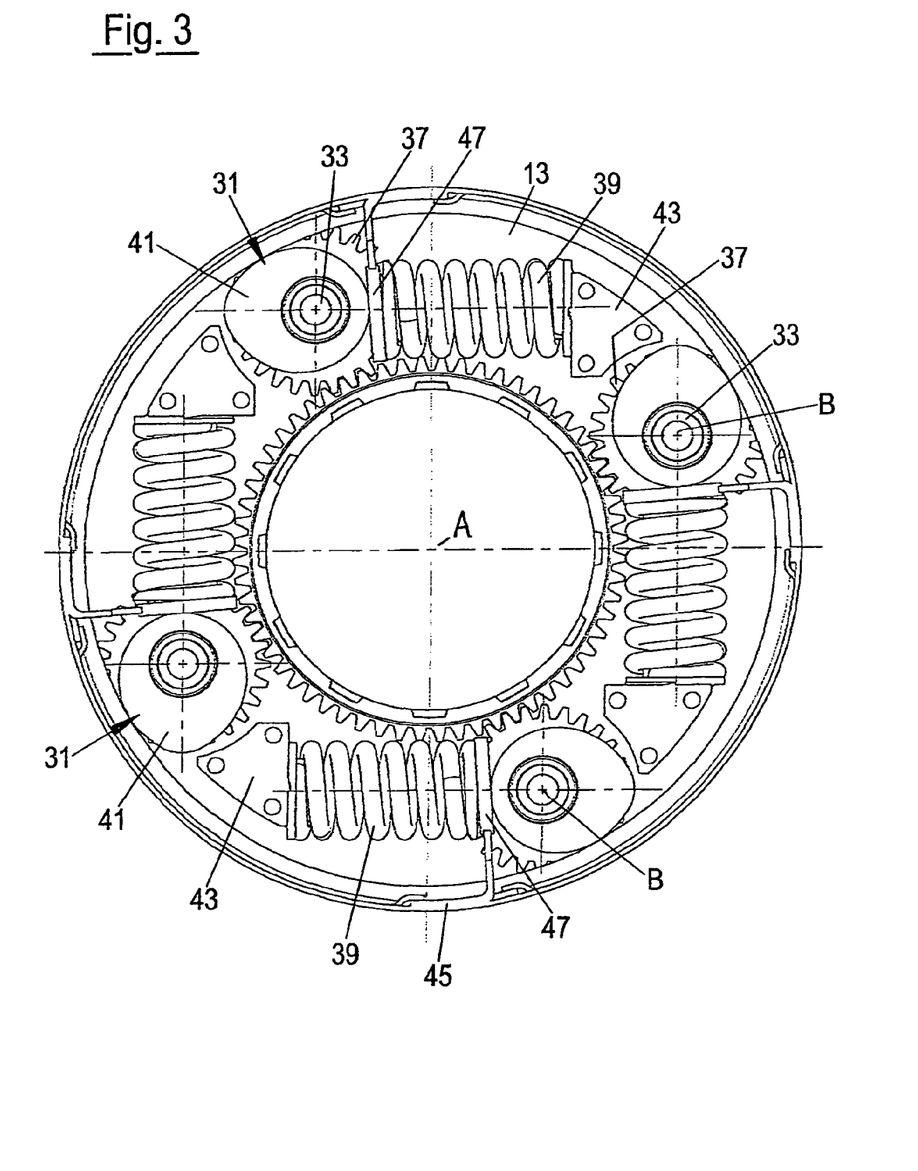
FIG. 3 shows parts of the first embodiment in a rear view.

FIGS. 2 and 3 show a first embodiment of a dual mass flywheel in which the reduction device 21 (FIG. 1) is realized by four cams 31 which are arranged distributed at an even spacing over the periphery of the dual mass flywheel. Each cam 31 is rotatably supported by means of an associated spigot 33 at the primary flywheel mass 11, with the axis of rotation B of the cam 31 being arranged offset in parallel with respect to the axis of rotation A of the dual mass flywheel. The cams 31 cooperate, on the one hand, with a toothed ring 35 which is rigidly connected to or formed integrally with the secondary flywheel mass 13. Each cam 31 has a spur gear toothed arrangement 37 which meshes with the toothed ring 35 for this purpose. The cams 31 can thus be driven synchronously to make a rotation about the respective axis of rotation B by a rotational movement of the secondary flywheel mass 13 relative to the primary flywheel mass 11.

On the other hand, each cam 31 cooperates with an end of a respective associated helical spring 39. For this purpose, each cam 31 has an eccentric section 41 (FIG. 3) which effects a compression of the respective helical spring 39 in the case of a rotation of the cam 31 about the axis of rotation B or—on a rotation in the opposite sense of rotation—a relaxation of the respective helical spring 39. The helical springs 39 thus act as compression springs and they are aligned tangentially, i.e. in the peripheral direction, with respect to the axis of rotation A of the dual mass flywheel. The respective other end of the helical springs 39 is connected to a fastening section 43 which is shaped at the primary flywheel mass 11.

The dual mass flywheel furthermore has a driver ring 45 which is rotatably supported at the secondary flywheel mass 13 (or at the primary flywheel mass 11). The driver ring 45 has four substantially radially inwardly (or radially outwardly) projecting driver blades 47. Each of the driver blades 47 is arranged between the eccentric section 41 of one of the cams 31, on the one hand, and the deflectable end of the respective helical spring 39, on the other hand. The respective driver blade 47 thus effects a low-friction mechanical coupling between the eccentric section 41, on the one hand, and the helical spring 39, on the other hand, with this function advantageously being satisfied for all cams 31 in common by a single component 45. The driver blade 47 can be arranged elastically pivotably at the driver ring 45. This is, however, not absolutely necessary.

The operation of the named first embodiment will be explained in the following: A relative rotational movement between the primary flywheel mass 11 and the secondary flywheel mass 13 means a rotational movement of the toothed ring 35 of the secondary flywheel mass 13 relative to the cams 31 arranged at the primary flywheel mass 11. Due to the engagement of the toothed ring 35 with the respective spur gear toothed arrangement 37 of the cams 31, they are driven to make a respective rotational movement so that different angular regions of the respective eccentric section 41 cooperate with the respective helical spring 39 via the associated driver blade 47. Provided therefore that the two flywheel masses 11, 13 are rotated relative to one another starting from a rest position, this means a synchronous deflection of all helical springs 39 together, whereby a restoring torque is generated.

Since the eccentric sections 41 of the cams 31 are designed in mirror symmetry and since the angular region of the respective eccentric section 41 with the lowest radius contacts the associated helical spring 39 in the rest position of the dual mass flywheel—as can be seen in FIG. 3—a respective restoring torque is generated on a relative rotation of the two flywheel masses 11, 13 in the two possible directions of rotation.

It is particularly advantageous if the respective eccentric section 41 of the cams 31 forms a cam profile whose radius has a non-linear angular dependence with respect to the axis of rotation B of the cam 31. A non-linear spring characteristic of the total system of helical spring 39, cam 31 and toothed ring 35 can hereby be set in a particularly simple manner.

The toothed ring 35 as well as the spur gear toothed arrangement 37 and the eccentric section 41 of the cams 31 are configured such that a reduction in the deflection movement of the respective helical spring 39 is effected with respect to the explained rotational movement of the two flywheel masses 11, 13 relative to one another. Helical springs 39 with a comparatively stiff characteristic can hereby be used which can be made correspondingly short. This makes it possible to arrange the helical springs 39, cams 31 and abutment sections 43 behind one another in the peripheral direction so that a very compact construction results, as can easily be seen from FIGS. 2 and 3, with a non-linear spring characteristic of the total system additionally being able to be set, as explained above.

Figure 4A:
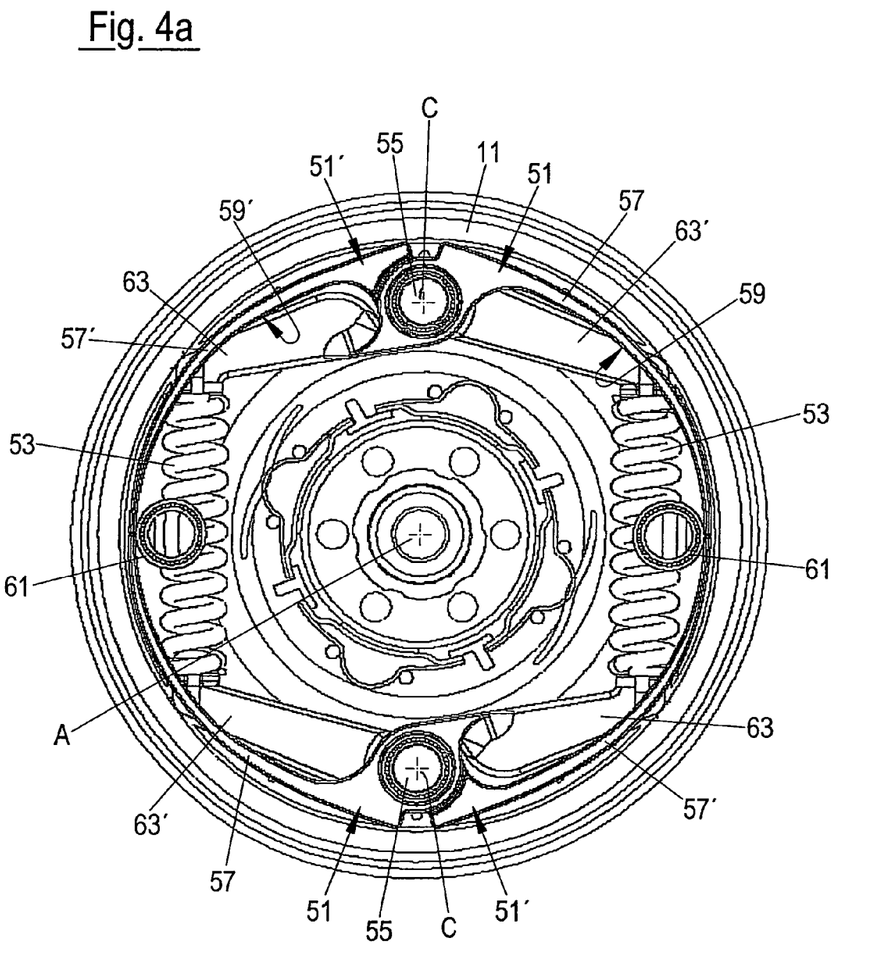
FIGS. 4a and 4b show parts of a dual mass flywheel in accordance with a second embodiment in a rest position in a front view and a perspective view respectively.
Figure 4B:
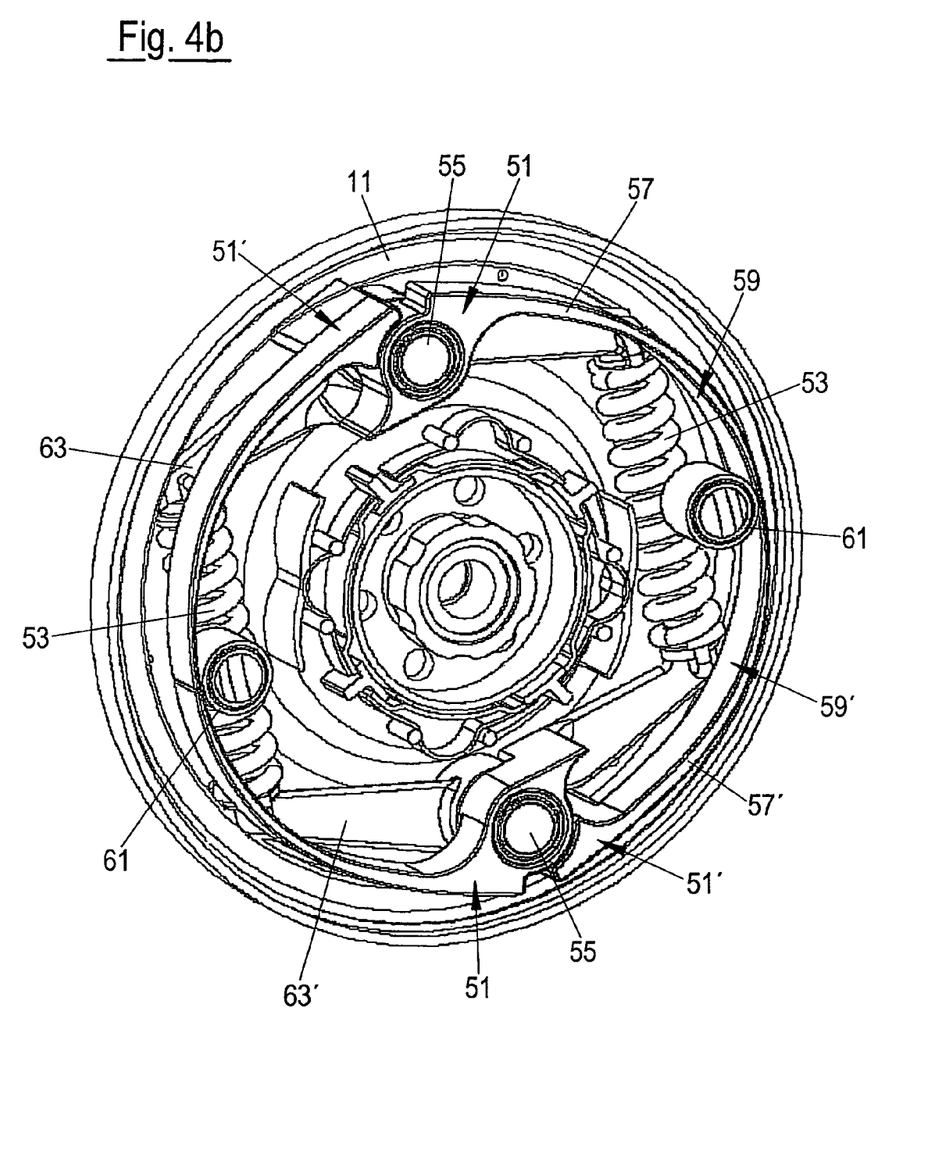
Figure 5A:
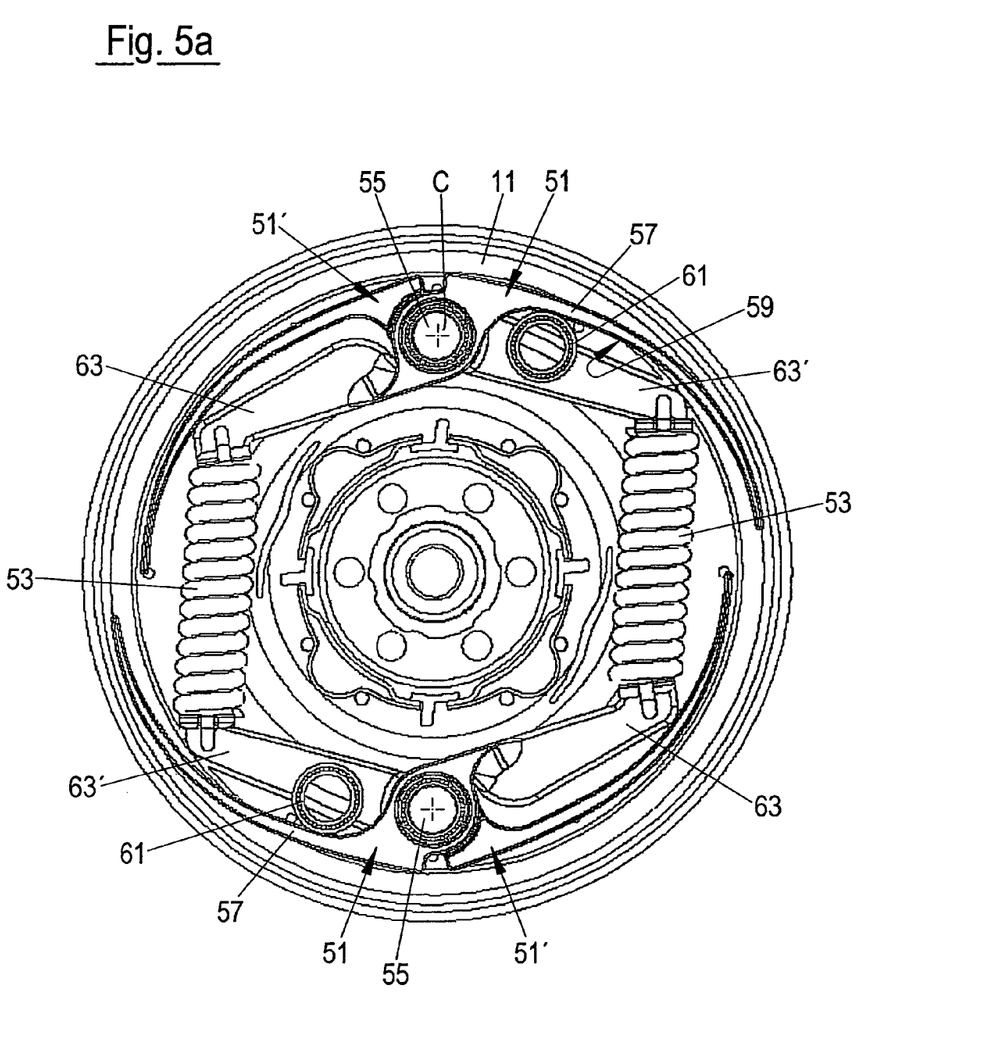
FIGS. 5a and 5b show parts of the second embodiment in a relative rotational position in a front view and in a perspective view respectively.
Figure 5B:
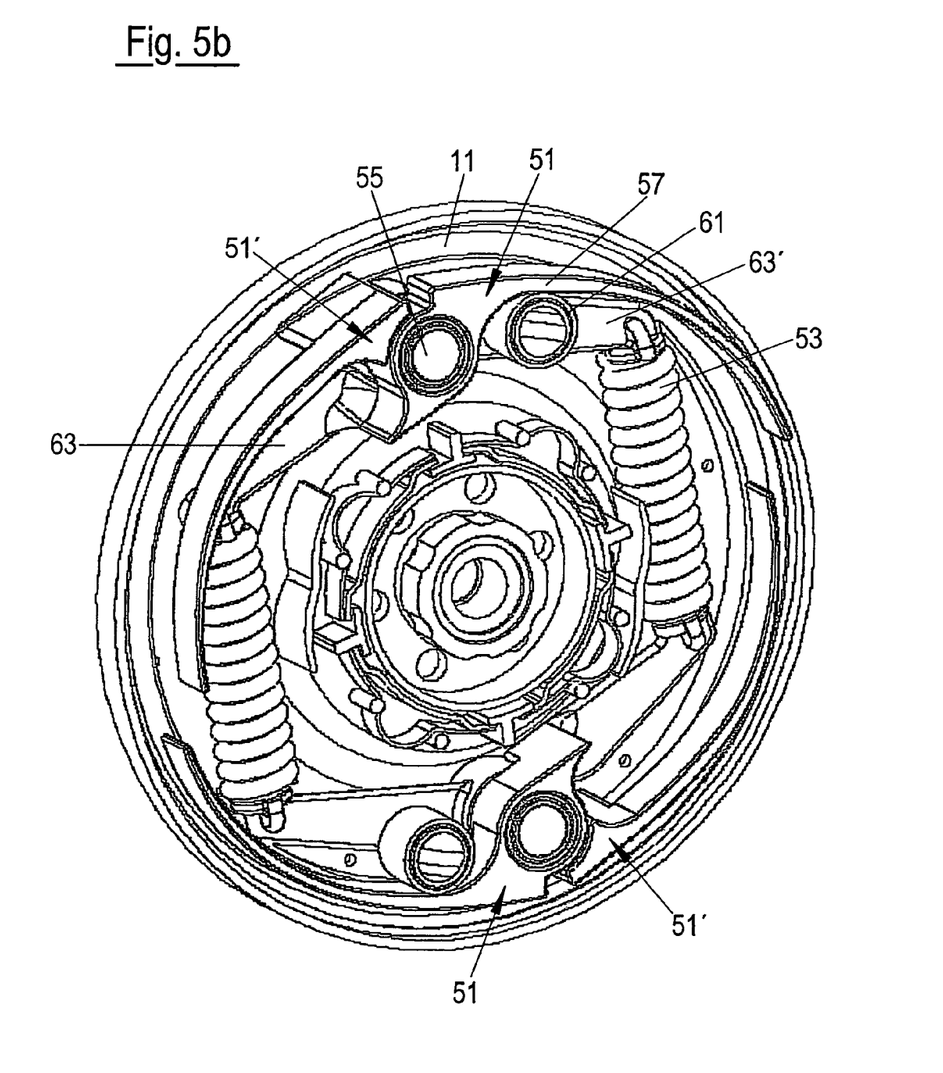

FIGS. 4 and 5 show a second embodiment of a dual mass flywheel in which the reduction device 21 (FIG. 1) has four pivot levers 51 which cooperate pair-wise with two helical springs 53. In this respect, a further pivot lever 51' is associated with a respective pivot lever 51, with the two pivot levers 51, 51' of a lever pair being pivotably supported independently of one another about a common pivot axis C at a common pivot bearing 55 of the primary flywheel mass 11.

On the one side with respect to the respective pivot bearing 55, each pivot lever 51 has a drive section 57 with a control track 59 formed thereon. A drive roll 61 rotatably supported at the secondary flywheel mass 13 (not shown in FIGS. 4 and 5) can be moved along the respective control track 59 in order hereby to effect a pivot movement of the respective pivot lever 51 or to allow a pivoting back of the pivot lever 51. On the other side of the respective pivot bearing 55, each pivot lever 51 has a deflection section 63 whose free end is connected to the respective helical spring 53. The named drive section 57 thus forms a first lever arm and the named deflection section 63 thus forms a second lever arm, with these two lever arms being rigidly connected to one another and with the respective pivot bearing 55 being arranged between these two lever arms.

The same applies accordingly to the named respective associated pivot lever 51', i.e. it likewise has a drive section 57' with a control track 59' and a deflection section 63'. It must be noted with respect to the representation in FIGS. 4 and 5 that the respective drive section 57, 57' and the respective deflection section 63, 63' of the pivot levers 51 and 51' respectively are arranged in different planes.

In the following, the operation of the named second embodiment in accordance with FIGS. 4 and 5 will be explained: In the rest position of the dual mass flywheel in accordance with FIGS. 4*a* and 4*b*, the two helical springs 53 acting as compression springs are maximally relaxed, with the deflection sections 63, 63' of the pivot levers 51, 51' to which the ends of the helical springs 53 are fastened, contacting respective abutment sections (not shown) of the primary flywheel mass 11. If now—relative to the representation in accordance with FIGS. 4*a* and 4*b*—the secondary flywheel mass is rotated counter clockwise relative to the primary flywheel mass 11, this means that the drive rolls 61 supported at the secondary flywheel mass 13 are pivoted about the axis of rotation A of the dual mass flywheel and in this respect roll off along the respective control track 59 of the two pivot levers 51. The pivot levers 51 are hereby gradually pivoted about the respective pivot axis C so that the respective deflection section 63 compresses the associated helical spring 53. The respective other end of the respective helical spring 53 in this respect maintains its position since this spring end—as explained above—contacts an abutment section of the primary flywheel mass 11 via the deflection section 63' of the associated pivot lever 51'. An increasing restoring torque is thus generated by the explained compression of the helical springs 53. The maximum relative rotational position of the two flywheel masses 11, 13 and the maximum compression of the helical springs 53 are shown in the FIGS. 5*a* and 5*b*.

It is understood that, starting from the rest position in accordance with FIGS. 4*a* and 4*b*, a relative rotation of the two flywheel masses 11, 13 can also take place in the opposite sense of rotation. In this case, the two pivot levers 51' are pivoted while the pivot levers 51 maintain their position. The respective restoring torque is generated for both directions of rotation by means of the two helical springs 53, with these being supported in a floating manner and either the one or the other respective end being deflected.

A rotational movement of the two flywheel masses 11, 13 relative to one another thus also results in a reduced deflection movement of the two helical springs 53 in the explained second embodiment so that helical springs 53 with a comparatively stiff characteristic can be used and the two helical springs 53 can be designed to be correspondingly short.

A particularly compact construction in particular results in that the helical springs 53 are arranged tangentially—i.e. in the peripheral direction—with respect to the axis of rotation A of the dual mass flywheel, with the pivot levers 51, 51' being arranged between the helical springs 53 in the peripheral direction. The fact also contributes to the compact construction size that the respective pivot bearing 55 is arranged between the drive section 57 and the deflection section 63 of the pivot levers 51, 51'—that is centrally. It is also of advantage in this connection that the two helical springs 53—as explained—are supported in a floating manner and are deflected at the one or at the other respective end in dependence on the sense of rotation of the two flywheel masses 11, 13 so that the helical springs 53 are used for both directions of rotation.

Since a pivot lever 51 and a pivot lever 51' respectively are supported at a common pivot bearing 55, an additional construction space advantage as well as a reduced manufacturing effort result.

It must still be remarked with respect to the second embodiment in accordance with FIGS. 4 and 5 that the respective control track 59, 59' of the pivot levers 51, 51' can also be designed here so that a non-linear global spring characteristic of the dual mass flywheel is realized.

Figure 6:
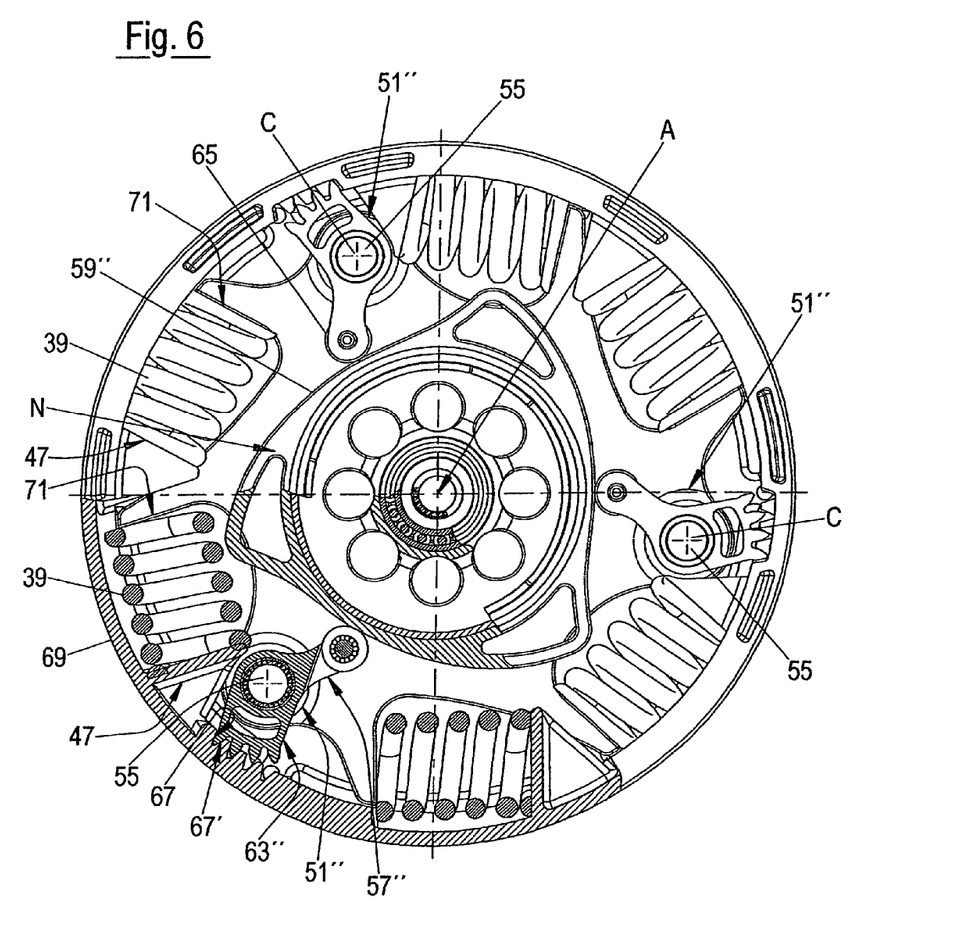
FIG. 6 shows parts of a dual mass flywheel in accordance with a third embodiment in a front view.

FIG. 6 shows a further embodiment of a dual mass flywheel. In this embodiment, the transmission device also active as a reduction device 21 in this example includes three pivot levers 51" which are each supported at a pivot bearing 55. Each of the pivot levers 51" has a drive section 57" and a deflection section 63". To prevent the centrifugal forces acting directly on the pivot levers 51" from causing tilting moments in operation of the dual mass flywheel, said pivot levers are balanced, i.e. the center of mass of the pivot levers 51" substantially coincides with the pivot axis C of the respective pivot bearing 55.

The respective drive section 57" of the pivot levers 51" cooperates via a roll 65 with a control track 59" which is formed at an internal cam N which is rotationally fixedly connected to the secondary flywheel mass 13.

On a relative rotation of the flywheel masses 11, 13 to one another, the pivot bearings 55 rotationally fixedly connected to the primary flywheel mass 11 change their position relative to the internal cam N. The drive sections 57" of the pivot levers 51" experience a deflection, which is transferred to the deflection sections 63", by the design of the control track 59" varying in the peripheral direction. The deflection sections 63" each have toothed arrangements 67 which cooperate with toothed arrangements 67' which are formed at an intermediate ring 69.

The intermediate ring 69 substantially corresponds in function to the driver ring 45 which was already explained with reference to FIG. 3 in connection with an alternative embodiment of the dual mass flywheel. The intermediate ring 69 likewise has driver blades 47 which are in turn in contact with an end of the helical springs 39. The other end of the helical springs 39 is supported via operative edges 71 at the primary flywheel mass 11.

In the embodiment shown, two driver blades 47 and two helical springs 39 are associated with each pivot lever 51". Although the helical springs 39 are arranged behind one another seen spatially in the peripheral direction, they act as elastic elements connected in parallel since the one respective spring end cooperates with the intermediate ring 69 and the other respective spring end is supported at the primary flywheel mass 11. Deviating from the embodiment shown, only one helical spring 39 can also be provided per pivot lever 51". It should moreover not remain unmentioned that the helical springs 39 can be replaced by elastic elements of a different design such as special springs, pressure cartridges, etc.

The helical springs 39 extend in a straight line between the driver blades 47 and the operative edges 71, whereby the helical springs 39 are less prone to deformations in the radial direction due to centrifugal forces which occur in the operation of the dual mass flywheel. Changes in the total characteristic of the spring device dependent on the speed of rotation can thereby be reduced.

As already briefly explained above, a relative rotation of the flywheel masses 11, 13 effects a deflection of the pivot levers 51" which is transmitted via the intermediate ring 69 to the helical springs 39. A modification of the characteristic of the rotationally elastic coupling of the flywheel masses 11, 13 dependent on the angle of relative rotation is achieved by a suitable design of the control track 59". In other words, the control track 59" forms, together with the pivot levers 51", the intermediate ring 69 and the helical springs 39, a mechanism which has a variable total characteristic depending on the angle of relative rotation. The control track 59", the pivot lever 51" and the toothed arrangements 67' of the intermediate ring 69 in this respect form a transmission device which transmits the relative rotational movement of the flywheel masses 11, 13 to the helical springs 39.

A direct coupling of the deflection sections 63" to the respective associated helical spring 39 is dispensed with by the use of the intermediate ring 69, which has the consequence that the centrifugal forces acting on the helical spring 39 are not transmitted to the pivot lever 51". A falsification dependent on rotation speed of the total characteristic of the rotationally elastic coupling of the flywheel masses 11, 13 is thus further reduced.

It is generally possible that instead of an intermediate ring 69 common to all pivot levers 51", individual intermediate elements are provided which are each associated with one pivot lever 51". In this case, however, the effect of the self-support of the centrifugal forces acting on the intermediate elements is not achieved. The use of individual intermediate elements can, however, be advantageous with specific applications and/or with specific construction requirements.

Instead of the variant of a dual mass flywheel with internal cam N shown in FIG. 6, an external cam can also be provided. The further functional elements for the rotationally elastic coupling of the two flywheel masses 11, 13 are in this case arranged correspondingly inverted so that a modification of the characteristic by a transmission device 21, 31, 51, 51" takes place from "radially outwardly to radially inwardly".

Figure 7:
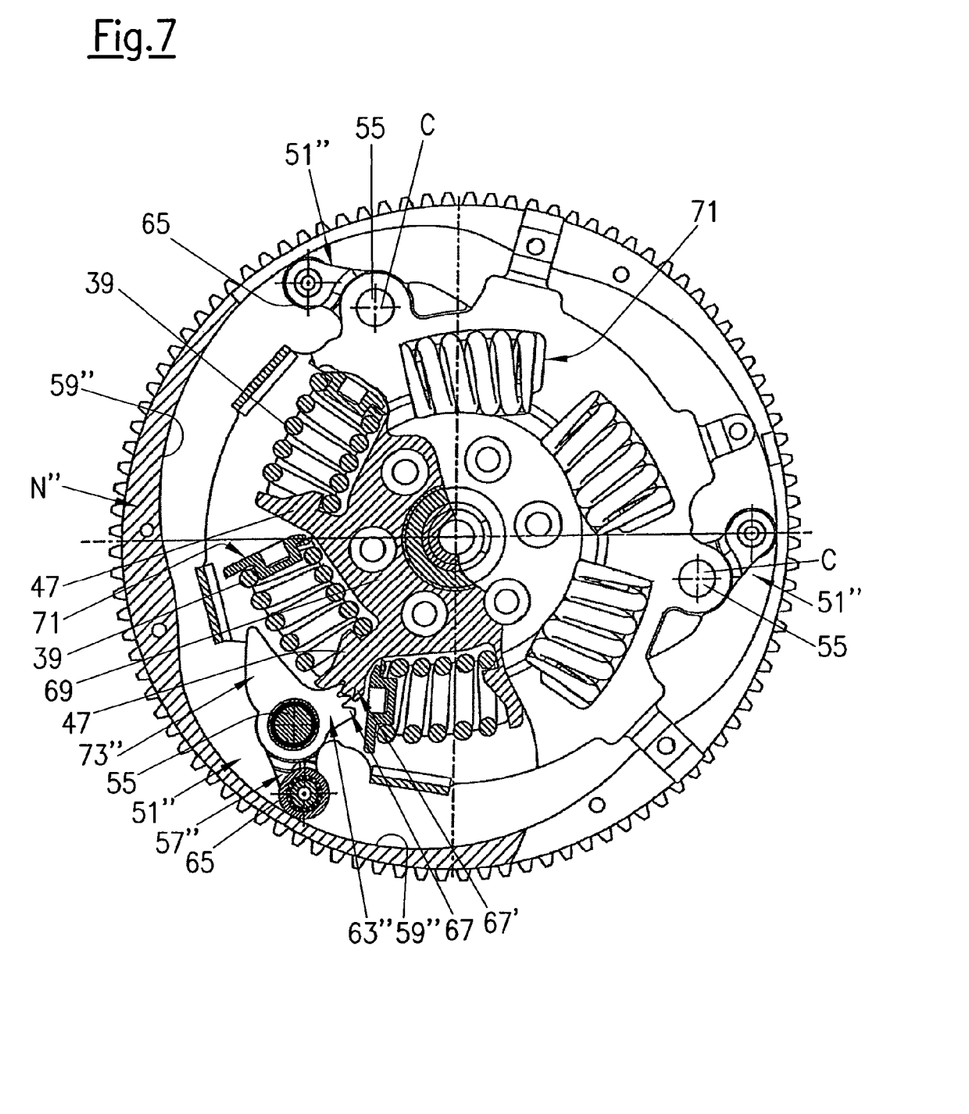
FIG. 7 shows parts of a dual mass flywheel in accordance with a fourth embodiment in a front view.

This is shown in FIG. 7. The transmission device also includes three pivot levers 51" which are each supported at a pivot bearing 55 in the embodiment in accordance with FIG. 7. Each of the pivot levers 51" has a drive section 57" and a deflection section 63". Balance sections 73"-prevent unwanted tilting moments due to centrifugal forces. The respective drive section 57" of the pivot levers 51" cooperates via a roll 65 with a control track 59" which is formed at an external cam N" which is rotationally fixedly connected to the primary flywheel mass and is arranged coaxially to the axis of rotation A of the dual mass flywheel.

On a relative rotation of the flywheel masses to one another, the pivot bearings 55 rotationally fixedly connected to the secondary flywheel mass change their position relative to the external cam N". The drive sections 57" of the pivot levers 51" experience a deflection, which is transferred to the deflection sections 63", by the design of the control track 59" varying in the peripheral direction. The deflection sections 63" of the pivot levers 51" each have toothed arrangements 67 which cooperate with toothed arrangements 67" which are formed at an intermediate ring 69 disposed radially inwardly here.

The intermediate ring 69 in accordance with FIG. 7 corresponds to the intermediate ring 69 in accordance with FIG. 6 in function. The intermediate ring 69 is supported in a floating manner about the axis of rotation of the dual mass flywheel and is rotationally movable both relative to the primary flywheel mass and relative to the secondary flywheel mass. The intermediate ring 69 also has driver blades 47 in the embodiment in accordance with FIG. 7 which are in turn in contact with an end of the helical springs 39. The other end of the helical springs 39 is supported via operative edges 71 at the secondary flywheel mass.

A modification of the characteristic of the rotationally elastic coupling of the flywheel masses dependent on the angle of relative rotation is achieved by a suitable design of the control track 59". In other words, the control track 59" forms, together with the pivot levers 51", the intermediate ring 69 and the helical springs 39, a mechanism which has a variable total characteristic depending on the angle of relative rotation. The control track 59", the pivot lever 51" and the toothed arrangements 67' of the intermediate ring 69 in this respect form a transmission device which transmits the relative rotation movement of the flywheel masses to the helical springs 39.

The respective primary side and secondary side can naturally also be reversed in the aforesaid embodiments.

The foregoing description of the embodiments has been provided for purposes of illustration and description. It is not intended to be exhaustive or to limit the invention. Individual elements or features of a particular embodiment are not generally limited to that particular embodiment but, where applicable, are interchangeable and can be used in a selected embodiment, even if not specifically shown or described. Such variations are not intended to be regarded as a departure from the invention, and all such modifications re intended to be included within the scope of the invention.

REFERENCE NUMERAL LIST 11 primary flywheel mass
13 secondary flywheel mass
15 sprocket
17 fastening flange
19 spring device
21 reduction device
23 fastening section
25 bearing section
27 drive spigot
31 cam
33 spigot
35 toothed ring
37 spur gear toothed ring
39 helical spring
41 eccentric section
43 fastening section
45 driver ring
47 driver blade
51, 51', 51" pivot lever
53 helical spring
55 pivot bearing
57, 57', 57" drive section
59, 59', 59" control track
61 drive roll
63, 63', 63" deflection section
35 roll 67, 67 toothed arrangement
69 intermediate ring
71 operative edge
73" balance section
A axis of rotation of the dual mass flywheel
B axis of rotation of the cam 31
C pivot axis of the pivot lever 51, 51', 51"
N internal cam
N" external cam

What is claimed is:

1. A dual mass flywheel for a drive train of a motor vehicle comprising:
   a primary flywheel mass;
   a secondary flywheel mass which is rotationally elastically coupled to the primary flywheel mass via at least one spring device; and
   at least one transmission device arranged between the spring device and at least one of the two flywheel masses, the transmission device effecting a reduction of a deflection movement of the spring device with respect to a rotational movement of the two flywheel masses relative to one another, wherein the transmission device modifies a characteristic of the spring device, wherein the transmission device has a cam profile and a counter-element moveable along the cam profile, wherein the cam profile is formed at an external cam or at an internal cam which is arranged rotationally fixedly with respect to one of the flywheel masses, wherein the transmission device cooperates with the spring device via an intermediate element which is rotatably supported with respect to an axis of rotation (A) of the dual mass flywheel and which is formed as a ring, wherein the transmission device has at least one lever which is pivotably connected to one of the two flywheel masses, wherein the lever has a drive section which via the counter-element and the cam profile cooperates with the other one of the two flywheel masses in order to drive the lever to make a pivot movement in response to a rotational movement of the two flywheel masses relative to one another, and wherein the lever has a deflection section which via the intermediate element cooperates with a respective end of the spring device to effect a deflection movement of the spring device in response to a pivot movement.

2. The dual mass flywheel in accordance with claim 1, wherein the transmission device effects a deflection movement of the spring device in accordance with a non-linear total characteristic.

3. The dual mass flywheel in accordance with claim 1, wherein the cam profile has a curvature radius varying along the cam profile.

4. The dual mass flywheel in accordance with claim 1, wherein the transmission device is formed by a replaceable assembly.

5. The dual mass flywheel in accordance with claim 1, wherein the spring device has at least one elastic element which is arranged tangentially with respect to the axis of rotation (A) of the dual mass flywheel, and wherein the elastic element preferably comprises a helical spring.

6. The dual mass flywheel in accordance with claim 1, wherein the spring device has two ends, with the spring device only being held at the two ends and being aligned substantially in a straight line between the two ends.

7. The dual mass flywheel in accordance with claim 1, wherein the intermediate element is rotationally moveable relative to both the primary flywheel mass and the secondary flywheel mass.

8. The dual mass flywheel in accordance with claim 1, wherein the intermediate element is supported in a floating manner.

9. The dual mass flywheel in accordance with claim 1, wherein the intermediate element has at least one driver section which cooperates with the spring device.

10. The dual mass flywheel in accordance with claim 9, wherein the intermediate element has at least one actuation section which cooperates with the transmission device.

11. The dual mass flywheel in accordance with claim 10, wherein two driver sections which cooperate with a respective elastic element of the spring device are associated with each actuation section of the intermediate element.

12. The dual mass flywheel in accordance with claim 1, wherein the lever is pivotally connected to the other one of the two flywheel masses via a pivot bearing, with the pivot bearing being arranged between the drive section and the deflection section of the lever.

13. The dual mass flywheel in accordance with claim 1, wherein the other respective end of the spring device is supported at the other one of the two flywheel masses.

14. The dual mass flywheel in accordance with claim 1, wherein the lever is balanced such that the center of gravity of the lever coincides with its pivot axis (C).

15. A dual mass flywheel for a drive train of a motor vehicle comprising:
    a primary flywheel mass;
    a secondary flywheel mass;
    at least one spring device elastically rotationally coupling said primary and secondary flywheel masses such that relative rotational movement therebetween causes a deflection movement of said spring device; and
    at least one transmission device disposed between said spring device and at least one of said primary and secondary flywheel masses and which is operable for reducing the deflection movement of said spring device by modifying a characteristic of said spring device, said transmission device including a cam rotationally fixed to one of said primary and secondary flywheel masses and having a cam profile, a pivot lever pivotally mounted to the other one of said primary and secondary flywheel masses, and an intermediate ring, said pivot lever having a deflection section and a driver section engaging said cam profile, and said intermediate ring having a first section engaged with said deflection section of said pivot lever and a second section engaging a first end of said spring device.

16. The dual mass flywheel in accordance with claim 15 wherein said intermediate ring is rotatably supported with respect to a common axis of rotation for said primary and second flywheel masses.

17. The dual mass flywheel in accordance with claim 15 wherein upon relative rotation between said primary and secondary flywheel masses said driver section of said pivot lever moves along said cam profile and causes said deflection section to act on said first section of said intermediate ring such that said second section of said intermediate ring applies a compressive force on said spring device.

18. The dual mass flywheel in accordance with claim 17 wherein said second section of said intermediate ring includes a driver blade engaging said first end of said spring device, and wherein a second end of said spring device is supported against an abutment formed on said other one of said primary and secondary flywheel masses.

19. The dual mass flywheel in accordance with claim 18 wherein said spring device is a coil spring arranged tangentially with respect to said axis of rotation of said primary and secondary flywheel masses with said first end engaging said driver blade on said intermediate ring and said second end supported against said abutment formed on said primary flywheel mass.

20. The dual mass flywheel in accordance with claim 15 wherein said deflection section of said pivot lever includes first teeth that are engageable with second teeth formed on said first section of said intermediate ring in response to movement of said driver section of said pivot lever along said cam profile due to relative rotational movement between said primary and secondary flywheel masses.

21. A dual mass flywheel for a drive train of a motor vehicle, comprising:
   a first flywheel mass;
   a second flywheel mass;
   a spring device elastically rotationally coupling said first and second flywheel masses such that relative rotational movement therebetween about a common rotary axis (A) causes a deflection movement of said spring device; and
   a transmission device disposed between said spring device and one of said first and second flywheel masses and which is operable to modify a characteristic of said spring device to cause a change in the deflection movement thereof, said transmission device including a cam fixed for rotation with said first flywheel mass, a pivot member pivotally mounted to said second flywheel mass, and an intermediate ring supported for rotation relative to at least one of said first and second flywheel masses about said common rotary axis (A), wherein said pivot member includes a first section and a second section engaging said cam, wherein said intermediate ring includes a first section engaging said first section of said pivot member and a second section engaging said spring device, and wherein said first section of said pivot member includes first teeth that are engageable with second teeth formed on said first section of said intermediate ring in response to movement of said second section of said pivot member along a cam profile on said cam due to relative rotational movement between said first and second flywheel masses.

22. The dual mass flywheel in accordance with claim 21 wherein upon relative rotation between said first and second flywheel masses said second section of said pivot member moves along said cam profile on said cam which causes said first section of said pivot member to act on said first section of said intermediate ring such that said second section of said intermediate ring applies a compressive force on said spring device.

* * * * *